Patented Sept. 20, 1932

1,877,790

UNITED STATES PATENT OFFICE

OTTO BAYER, OF FRANKFORT-ON-THE-MAIN, GERMANY, ASSIGNOR TO GENERAL ANILINE WORKS, INC., OF NEW YORK, N. Y., A CORPORATION OF DELAWARE

KETONES OF THE ANTHRAQUINONE SERIES AND PROCESS OF MAKING SAME

No Drawing. Application filed October 9, 1931, Serial No. 567,986, and in Germany October 16, 1930.

My present invention relates to ketones of the anthraquinone series and a process of making same. It relates more particularly to ketones of the general formula

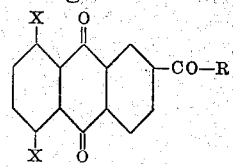

(wherein one X means hydrogen, the other X a nitro- or an amino-group and R means the radical of aromatic compound containing a labile hydrogen atom).

These ketones are obtained in accordance with this invention by condensing a nitro-anthraquinone-2-carboxylic acid halide of the formula

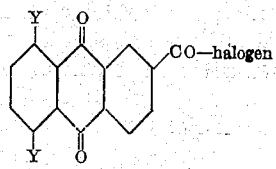

(wherein one Y means hydrogen, the other Y a nitro-group) with an aromatic compound containing a labile hydrogen atom in the presence of a condensing agent of the group consisting of aluminium chloride and ferric chloride, advantageously with the addition of a diluent and by reducing the nitro-ketone thus formed.

Aromatic compounds suitable for this process are for example naphtalene, acenaphtene, N-alkyl-carbazoles, diphenylene oxide and especially benzene which may contain as substituents phenyl, phenoxy, alkyl or halogen.

Although for example o-nitro-benzoyl-chloride and benzene when subjected to Friedel-Crafts's reaction yield only resinous products (Ber. d. deutsch. chem. Ges., vol. 18, page 2400 and vol. 53, page 1393) and nitro compounds are known to be reduced in the presence of aluminium chloride (Houben-Weyl, Methoden der organischen Chemie, II, edition, vol. II, page 327), the present process yields in a smooth reaction nitro-anthraquinonyl-arylketones.

The nitro- and amino-ketones thus obtained may be employed as intermediates for the production of dyestuffs. For instance the amino-ketones yield valuable dyestuffs by acylating only or by condensing them with halogenated aromatic compounds.

Instead of starting from pure 5- or 8-nitro-anthraquinone-carboxylic acid halides with the same success the technical mixture of these two nitro compounds may be employed. The products obtained from this mixture according to the present process, i. e. the mixtures of isomeric nitro-, amino- or acylamino-ketones, may be employed as such or they may be separated into their components at any stage of the process of production.

In order to further illustrate my invention the following examples are given, the parts being by weight and all temperatures in centigrade degrees. But I wish it to be understood that my invention is not limited to the particular products nor reacting conditions mentioned therein.

Example 1

200 parts of a mixture of 5- and 8-nitro-anthraquinone-2-carboxylic acid chloride (melting at 183–185°) and 170 parts of diphenyl are dissolved in about 400 parts of dehydrated nitrobenzene. A solution of 105 parts of aluminium chloride in 400 parts of nitrobenzene is introduced while stirring during 1–2 hours. By weakly cooling the temperature is maintained at about 30–40°. After a further ½ hour the mass is slowly warmed to 40–50°. When the reaction has durated about 3 hours the brown solution is introduced while stirring into cold water containing hydrochloric acid. From this mixture the formed 5-(8-) nitro-2-anthraquinonyl-diphenyl-ketone is isolated by adding about 1500 parts of petrol and filtering. After washing with water and alcohol the pure ketone is obtained with an excellent yield in colorless crystals. It melts at 200–204° and corresponds to the formula

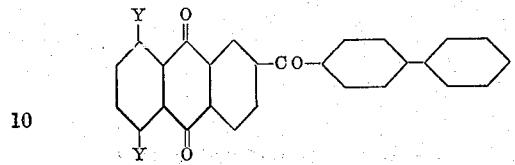

(wherein one Y means hydrogen, the other a nitro-group).

Instead of starting from the mixture of 5- and 8-nitro-anthraquinone-2-carboxylic acid chloride one may start with the same success from the pure ingredients of the said mixture. These may be prepared by dissolving the mixture in a 94% sulfuric acid and fractionally precipitating.

20 parts of the above mentioned nitroketone are finely divided by dissolving in sulfuric acid or by grinding, mixed with 50 parts of crystallized sodium sulfide and 300 parts of water and warmed to 80–90° for about 1 hour. The precipitate thus formed is filtered and washed with hot water. The mixture of amino-ketone of the formula

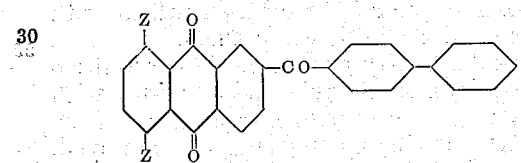

(wherein one Z means hydrogen, the other Z an amino-group) which is thus isolated represents a ruby-red powder melting at 200°. It shows affinity to cotton and may be used for the production of dyestuffs by condensing it with acyl-chlorides or halogen-anthraquinones.

By dissolving it in 10 parts (relating to 1 part of the mixture of amino-ketone) of trichlorobenzene and precipitating, the isomeric components of the mixture may be obtained. The portion filtered at 100° represents dark red needles melting at 242–244°. It represents about 35% of the starting mixture and is probably 5-amino-2-anthraquinonyl-diphenyl-ketone. In sulfuric acid mixed with formaldehyde it forms a reddish brown solution. Its benzoyl compound melts at 244° and dyes cotton from an olive green vat intense greenish yellow shades.

By cooling the mother liquor or trichlorobenzene and by adding advantageously petrol, the remaining 65% of the starting mixture precipitate. This compound is probably 8-amino-2-anthraquinonyl-diphenyl-ketone. It is more yellowish than the 5-isomeric compound. In sulfuric acid mixed with formaldehyde it forms a violet brown solution. It melts at 195–197°. Its benzoyl compound melts at 257° and dyes cotton from a reddish violet vat intense greenish yellow shades.

Instead of starting from the isolated mixture of 5- and 8-nitro-anthraquinone-2-carboxylic acid chloride one may start also from the mixture of 5- and 8-nitro-anthraquinone-2-carboxylic acid and effect the formation of the acid chloride and the condensation as a single operation.

*Example 2*

To a suspension of 50 parts of 5-(8) nitro-anthraquinone-2-carboxylic acid chloride in about 250 parts or mono-chlorobenzene, 40 parts of aluminium chloride are added at 30–35° while stirring. After about 3 hours the mass is warmed for a short time to 40–45° and the brown solution is then poured into acidulated water. When the precipitation of the nitro-ketone is finished the precipitate is filtered and washed with water and alcohol. The mixture of 5- and 8-nitro-2-anthraquinonyl-4'-chloro-phenyl-ketone thus obtained melts inexactly at 190°. It is wetted with alcohol and reduced by one hour's warming with a solution of sodium sulfide. The amino-ketone thus prepared corresponds to the formula

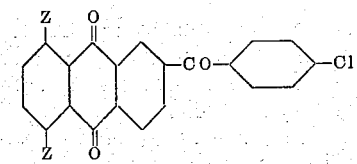

(wherein one Z means hydrogen, the other Z an amino-group). It represents a brick-red crystallized powder, soluble in sulfuric acid with a yellowish orange shade turning to chestnut-brown after the addition of formaldehyde.

*Example 3*

30 parts of 5-(8) nitro-anthraquinone-2-carboxylic acid chloride are mixed with 300 parts of 1.3-dimethyl-benzene and 150 parts of carbon disulfide. The mixture is allowed to react at 15° with 20 parts of aluminium chloride. After about 12 hours the mass is worked up as described in the foregoing examples. The mixture of nitro-ketone thus obtained yields on reduction 5-(8) amino-2-anthraquinonyl-2'.4'-dimethyl-phenyl-ketone of the formula

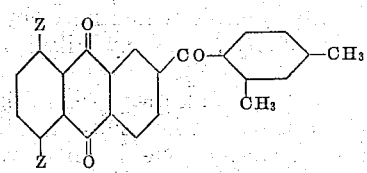

(wherein one Z means hydrogen, the other Z an amino-group). It represents a bright red powder melting at 180–190°.

Example 4

By replacing in Example 1 diphenyl by the corresponding amount of diphenyl-ether and condensing it with 5-nitro-anthraquinone-2-carboxylic acid chloride (melting at 198–202° 5-nitro-2-anthraquinonyl-4'-phenoxy-phenyl-ketone is obtained. It corresponds to the formula

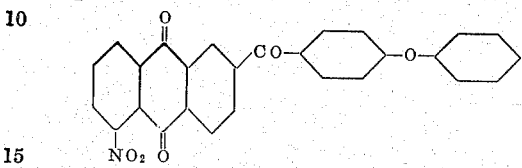

It melts at 255–260° and may be converted like the aforesaid nitro-ketones into the corresponding amino compounds.

I claim:

1. A process which comprises condensing a nitro-anthraquinone-2-carboxylic acid halide of the formula

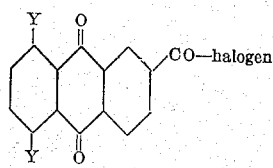

(wherein one Y means hydrogen, the other Y a nitro-group) with benzene which may contain as substituents phenyl, phenoxy, alkyl or halogen, in the presence of a condensing agent of the group consisting of aluminium chloride and ferric chloride and reducing the nitro-ketone thus formed.

2. A process which comprises condensing a nitro-anthraquinone-2-carboxylic acid halide of the formula

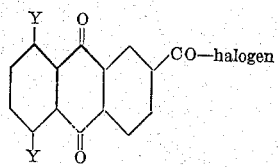

(wherein one Y means hydrogen, the other Y a nitro-group) with diphenyl in the presence of aluminium chloride and reducing the nitro-anthraquinone-diphenyl-ketone thus formed.

3. As new compounds the ketones of the anthraquinone series corresponding to the general formula

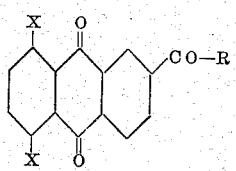

(wherein one X means hydrogen, the other X a nitro or amino group and R means a benzene nucleus which may contain as substituents phenyl, phenoxy, alkyl or halogen) which compounds represent when dry colored powders, having a definite melting point, being insoluble in water soluble in concentrated sulfuric acid.

4. As new compounds the ketones of the anthraquinone series corresponding to the general formula

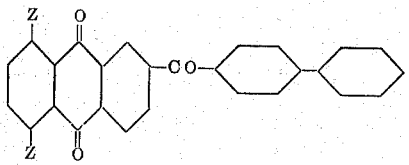

(wherein one Z means hydrogen, the other Z an amino-group) which compounds represent when dry red powders, having a definite melting point, being insoluble in water, soluble in concentrated sulfuric acid when mixed with formaldehyde with a brownish tint.

5. As a new compound the 5-amino-anthraquinone-diphenyl-ketone of the formula

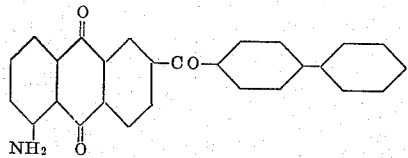

which compound represents when dry dark red needles, melting at 242—244°, being insoluble in water, soluble in concentrated sulfuric acid mixed with formaldehyde with a reddish brown tint, forming a benzoyl compound of melting point 244°, which dyes cotton from an olive green vat intense greenish yellow shades.

6. As a new compound the 8-amino-anthraquinone-diphenyl-ketone of the formula

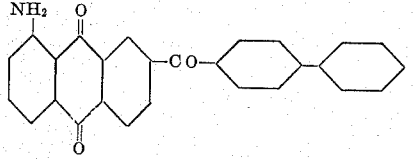

which compound represents when dry a yellowish red powder, melting at 195–197°, being insoluble in water, soluble in concentrated sulfuric acid mixed with formaldehyde with a violetish brown tint, forming a benzoyl compound of melting point 257°, which dyes cotton from a reddish violet vat intense greenish yellow shades.

In testimony whereof, I affix my signature.

OTTO BAYER.